(12) United States Patent
Tamiya

(10) Patent No.: US 7,493,007 B2
(45) Date of Patent: Feb. 17, 2009

(54) HERMETIC SEAL DEVICE FOR POLARIZATION-MAINTAINING OPTICAL FIBER AND HERMETIC SEAL PARTITION

(75) Inventor: Hideaki Tamiya, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 11/691,812

(22) Filed: Mar. 27, 2007

(65) Prior Publication Data
US 2007/0230857 A1 Oct. 4, 2007

(30) Foreign Application Priority Data
Mar. 29, 2006 (JP) ............... P2006-089962

(51) Int. Cl.
*G02B 6/00* (2006.01)
(52) U.S. Cl. ................... 385/138; 385/88
(58) Field of Classification Search .......... None
See application file for complete search history.

(56) References Cited

U.S. PATENT DOCUMENTS 6,758,602 B2   7/2004   Yamaguchi et al.

7,267,492 B2 * 9/2007 Ikeda et al. ............... 385/88

FOREIGN PATENT DOCUMENTS

| JP | 59-057203 | 4/1984 |
| JP | 06-067038 | 3/1994 |
| JP | 2002-333554 | 11/2002 |
| JP | 2003-014988 | 1/2003 |
| WO | 03/027734 | 4/2003 |

* cited by examiner

*Primary Examiner*—Sung H Pak
(74) *Attorney, Agent, or Firm*—Bell, Boyd & Lloyd LLP

(57) ABSTRACT

A hermetic seal device for a polarization-maintaining optical fiber is provided. The hermetic seal device includes a polarization-maintaining optical fiber and a cylindrical member to be inserted by the polarization-maintaining optical fiber, where the cylindrical member has the difference $3\times10^{-6}$/K or less in expansion-coefficient absolute value between the polarization-maintaining optical fiber and the cylindrical member.

6 Claims, 4 Drawing Sheets

HERMETIC SEAL DEVICE FOR POLARIZATION-MAINTAINING OPTICAL FIBER AND HERMETIC SEAL PARTITION

CROSS REFERENCES TO RELATED APPLICATIONS

The present application claims priority to Japanese Patent Application JP 2006-089962 filed in the Japanese Patent Office on Mar. 29, 2006, the entire contents of which are incorporated herein by reference.

BACKGROUND

The present application relates to a hermetic seal device, into which a polarization-maintaining optical fiber penetrates from one space to the other through a partition for achieving airtightness of the polarization-maintaining optical fiber, and a hermetic sealing partition therefor.

Means for inserting an optical fiber into a partition dividing a space requiring airtightness includes a method in that the partition is provided with a hole having a diameter similar to that of the optical fiber and the clearance between the optical fiber and the hole is filled with a sealing compound such as low melting glass and a resin. Specifically, an airtight sealing structure is disclosed in that an optical fiber is inserted into a metallic pipe having a small-diameter low melting-glass injection hole, and the low-melting glass is poured through the hole (see Japanese Unexamined Patent Application Publication No. H6-67038, [0002] [0011], for example).

According this Publication, by the strain due to differences in expansion coefficient of materials (optical fiber $5 \times 10^{-7}$/K, low melting glass $60 \times 10^{-7}$/K, and metallic pipe $180 \times 10^{-7}$/K), polarization characteristics are deteriorated. Hence, according this Publication, by inserting a glass pipe between the optical fiber and the metallic pipe, the contact area between the optical fiber and the low melting glass is minimized so as to reduce the stress applied to the optical fiber.

Recently, the reduction in effect of the stress due to the difference in expansion coefficient has been demanded from industrial circles, and means for securely preventing polarization characteristics from being deteriorated is required. For example, when the polarization-maintaining optical fiber is incorporated in a displacement detection sensor, a spectrointerferometer, or a fixed-point detector, the required extinction ratio is 20 dB or more, and with increasing extinction ratio, the deterioration in accuracy is smaller relative to the deflection of the optical fiber.

SUMMARY

In view of such situations, it is desirable to provide a hermetic seal device for a polarization-maintaining optical fiber capable of definitely maintaining polarization characteristics of the polarization-maintaining optical fiber, and a hermetic sealing partition therefor.

According to an embodiment, there is provided a hermetic seal device for a polarization-maintaining optical fiber, which includes a polarization-maintaining optical fiber and a cylindrical member to be inserted by the polarization-maintaining optical fiber, in which the cylindrical member has the difference $3 \times 10^{-6}$/K or less in expansion-coefficient absolute value between the polarization-maintaining optical fiber and the cylindrical member.

According to the embodiment, the cylindrical member having the difference $3 \times 10^{-6}$/K or less in expansion-coefficient absolute value between the polarization-maintaining optical fiber and the cylindrical member is included, so that the effect due to the difference in expansion coefficient can be suppressed to the utmost. Thereby, the deterioration in polarization characteristics of the polarization-maintaining optical fiber can be definitely prevented.

The material of the polarization-maintaining optical fiber may be the same as that of the cylindrical member. In this case, the difference in expansion-coefficient absolute value is 0/k.

According to an embodiment, the hermetic seal device may further include a resin sealing material provided around the polarization-maintaining optical fiber within the cylindrical member. In the process of manufacturing the hermetic seal device for a polarization-maintaining optical fiber, the heating temperature when the resin sealing material is included is lower in comparison with that when low melting glass is included, so that the change in temperature is also small so as to more reduce the effect due to the difference in expansion coefficient.

In technical terms, a resin may be interpreted to include glass; however, the resin herein excludes the glass.

In particular, preferably, the resin sealing material is an epoxy resin. Alternatively, low melting glass sealing material may also be included instead of the resin sealing material.

According to an embodiment, the cylindrical member may be made of an alloy, a glass material, or ceramics. The ceramics may include zirconia used as a ferrule of the polarization-maintaining optical fiber.

According to another embodiment, there is provided a hermetic seal partition that includes a polarization-maintaining optical fiber and a wall member to be inserted by the polarization-maintaining optical fiber, in which the wall member has the difference $3 \times 10^{-6}$/K or less in expansion-coefficient absolute value between the polarization-maintaining optical fiber and the wall member.

Additional features and advantages are described herein, and will be apparent from, the following Detailed Description and the figures.

DETAILED DESCRIPTION

Embodiments will be described below with reference to the drawings.

Figure 1:
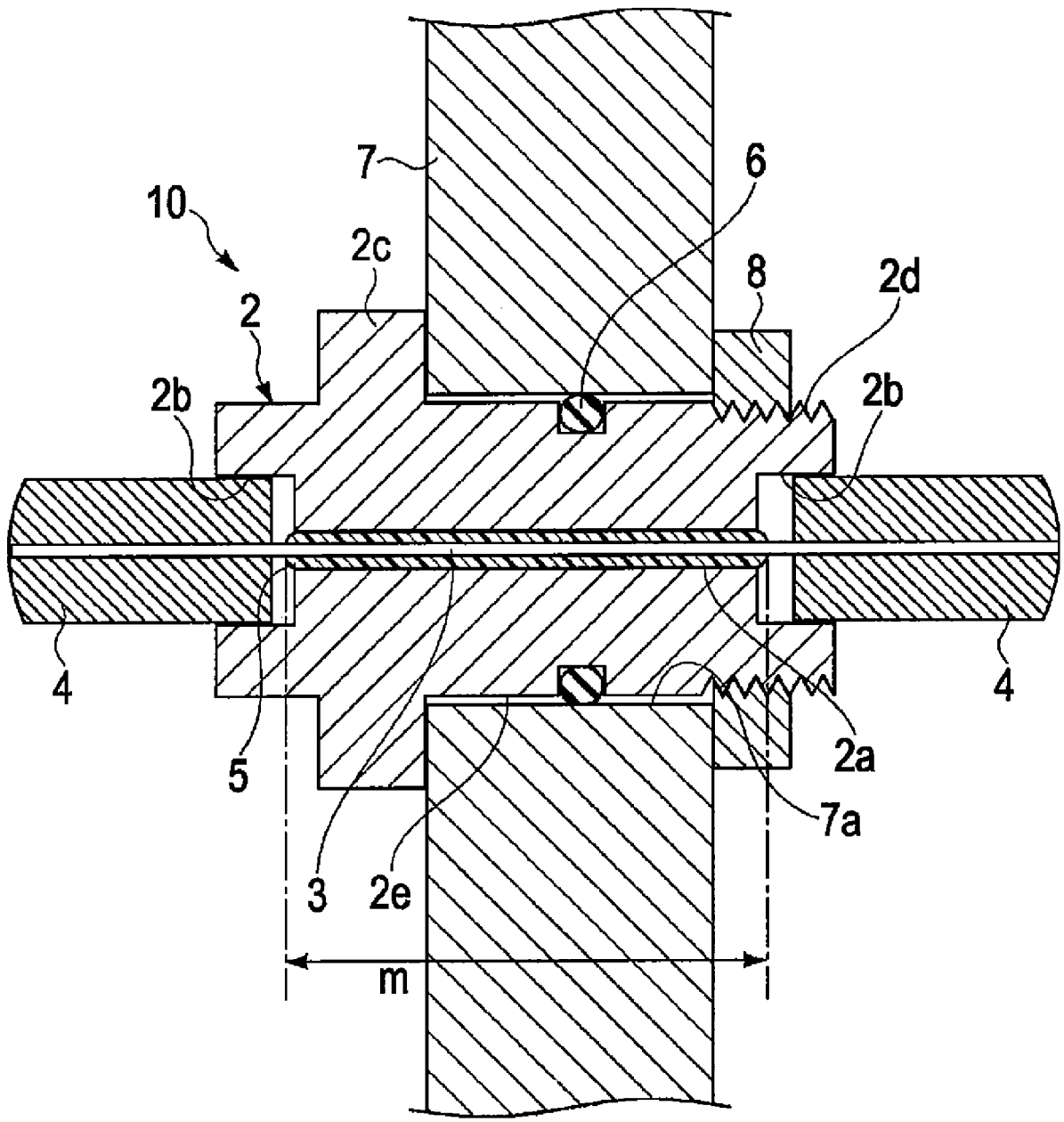
FIG. 1 is a sectional view of a hermetic seal device for a polarization-maintaining optical fiber according to an embodiment.

FIG. 1 is a sectional view of a hermetic seal device for a polarization-maintaining optical fiber (simply referred to as a hermetic seal device below) according to an embodiment.

The hermetic seal device 10 includes a cylindrical member 2 and a polarization-maintaining optical fiber 3 inserted into a through hole 2a provided in the cylindrical member 2. The polarization-maintaining optical fiber (core wire composed of a core and a clad herein) 3 is held with ferrules 4 at both sides of the cylindrical member 2. Both the ferrules 4 are fitted into recesses 2b of the cylindrical member 2 on both sides, respectively. The ferrule 4 is provided for connecting the polarization-maintaining optical fiber 3 to another polarization-maintaining optical fiber (not shown) with a connector, so that the ferrule 4 is not an essential part in the hermetic seal device 10 according to the embodiment.

The cylindrical member 2 has a tubular shape with a flange 2c at one end and a threaded portion 2d at the other end, for example. The threaded portion 2d is to be screwed with a nut 8. On the external surface of the cylindrical member 2 between the flange 2c and the nut 8, an O-ring 6 is fitted. For forming a hermetic space, a wall member 7 is provided with an opening 7a formed for inserting the cylindrical member 2. As shown in FIG. 1, when the nut 8 is tightened in a state that the cylindrical member 2 is inserted into the opening 7a, the wall member 7 is pinched between the flange 2c and the nut 8, so that the hermetic seal device 10 is fixed to the wall member 7. In FIG. 1, any one side of the wall member 7 is a vacuum state or an airtight state. Generally, the side of the nut 8 is an atmospheric state (not the airtight state).

Figure 2:
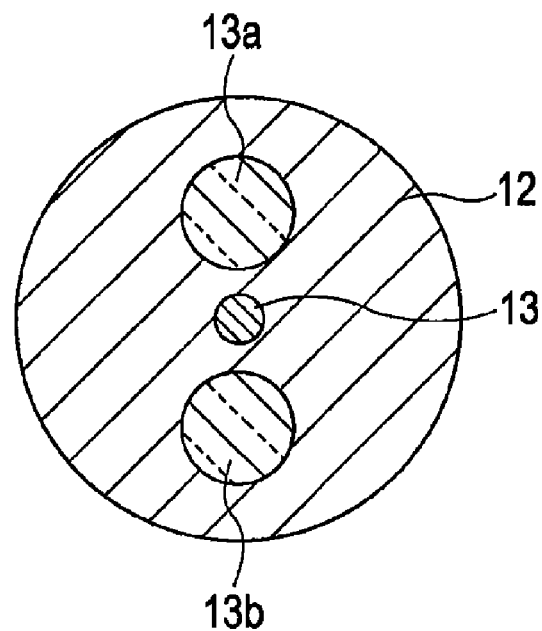
FIG. 2 is a cross-sectional view of a general polarization-maintaining optical fiber.
Figure 3:
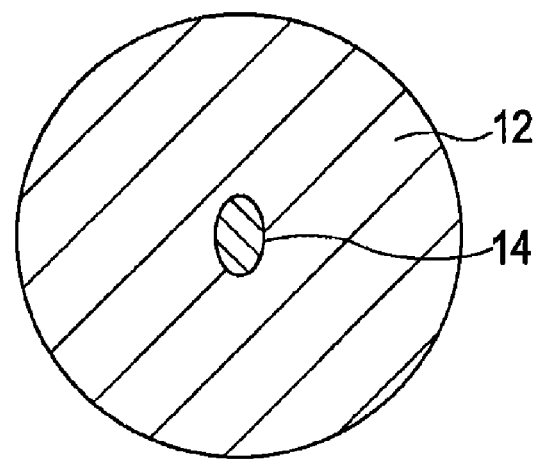
FIG. 3 is a cross-sectional view of another general polarization-maintaining optical fiber.

FIG. 2 is a cross-sectional view of a general polarization-maintaining optical fiber. This is called a panda fiber, and in order to apply a predetermined stress to a core 13 in a predetermined direction, a glass 13a and a glass 13b, which is different in material from the glass 13a, are arranged in a clad 12 symmetrically about the core 13. FIG. 3 is a cross-sectional view of another general polarization-maintaining optical fiber. This polarization-maintaining optical fiber includes an elliptic core 14. By configuring the polarization-maintaining optical fiber as shown in FIGS. 2 and 3, the optical transmission can be made in a state that the polarization waves are maintained.

The through hole 2a is filled with a sealing compound 5 for securing airtightness. The sealing compound 5 is made of a resin or low melting glass, for example. In the case of the resin, an epoxy resin may be used; however not limited to this. The heating temperature when the resin sealing compound is used is low in comparison with that when the low melting glass is used, so that the change in temperature is small and the effect due to the difference in expansion coefficient can be more reduced. Specifically, in the case of the epoxy resin, the airtightness is secured by the curing at about 100° C. after the through hole 2a is filled with the sealing compound 5. Using the resin sealing compound 5 facilitates the manufacturing as well as reduces the manufacturing cost.

However, in the case of the resin sealing compound 5, the sealing property is inferior to that of glass, so that the sealing compound 5 is extended as further as possible along the longitudinal direction of the polarization-maintaining optical fiber. Thereby, the sealing property can be ensured.

According to an embodiment, the difference in expansion-coefficient absolute value between the polarization-maintaining optical fiber 3 and the cylindrical member 2 is established to be $3 \times 10^{-6}$/K or less. Such a difference in expansion coefficient can suppress the effect due to the difference in expansion coefficient to the utmost. Thereby, the deterioration in polarization characteristics, i.e., the deterioration in extinction ratio, can be securely prevented. According to an experimental study associated with the present application, it was confirmed that the polarization characteristics were preferably maintained.

Specifically, the polarization-maintaining optical fiber 3 is generally made of quartz glass. In a case of the quartz glass, at the temperature (0 to 50° C., for example) when the hermetic seal device 10 is used, the expansion coefficient is $5 \times 10^{-7}$/K.

On the other hand, the cylindrical member 2 is made of a metallic alloy, a glass material, or ceramics. When the cylindrical member 2 herein is made of stainless steel $10 \times 10^{-6}$/K in expansion coefficient, if the temperature difference is 80° C. during heating processing, the difference in expansion becomes 3.8 μm in the epoxy resin sealing compound 5 mm in length. However, at temperatures of 0 to 50° C., the cylindrical member 2 with an expansion coefficient of $2 \times 10^{-6}$/K is used so as to have the difference 0.6 μm in expansion.

Specifically, in the case of the alloy cylindrical member 2, super invar (Fe—Ni alloy) may be used. In the case of the glass cylindrical member 2, the low melting glass $2 \times 10^{-6}$/K or less in expansion coefficient may be used, which includes quartz glass and synthetic quartz glass.

When the low melting glass is used for the sealing compound, the hermetic seal device 10 is heated at a temperature of 280° C. or more. In this case, the difference in expansion coefficient is also a problem more than the case of the resin sealing compound 5; however, by using the low expansion material mentioned above for the cylindrical member 2, there is no problem even lengths of the cylindrical member 2 and the sealing compound 5 are elongated. That is, this is because when the cylindrical member 2 and the sealing compound 5 are materials with a small expansion coefficient, their elongations are also negligible small even if their lengths are elongated. The configuration of the hermetic seal device 10 can also be simplified, reducing the manufacturing cost.

Figure 4:
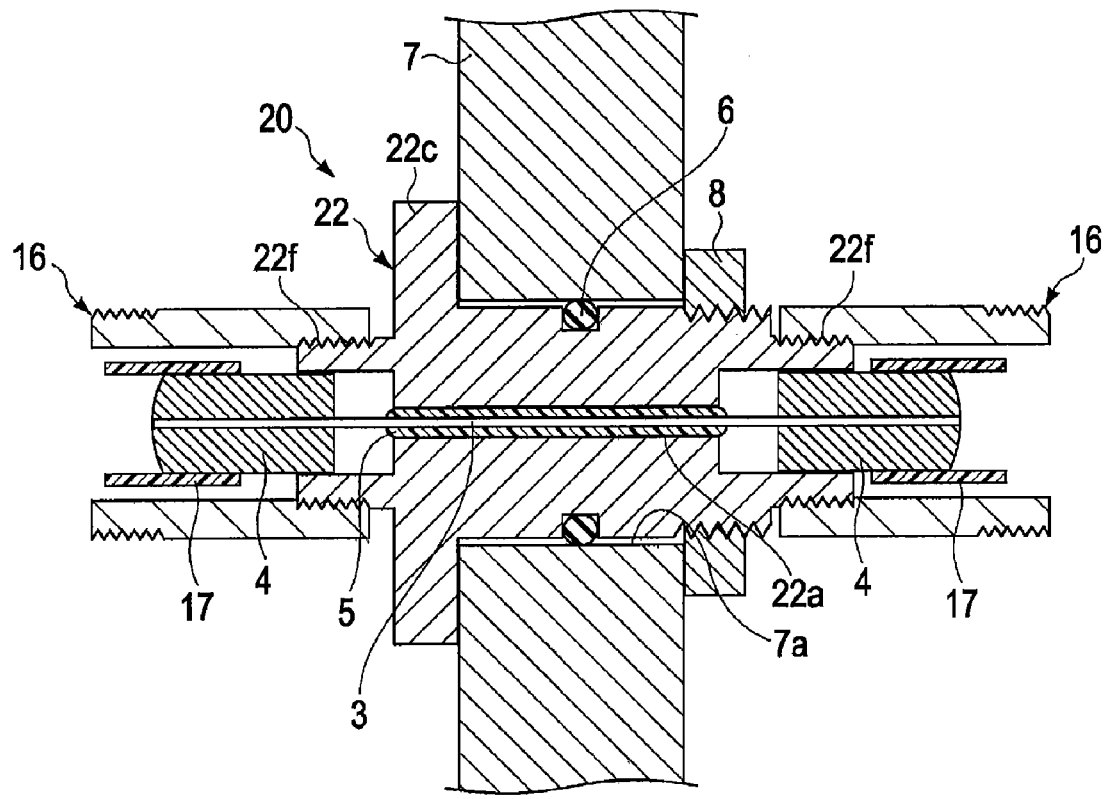
FIG. 4 is a sectional view of a hermetic seal device according to another embodiment.

FIG. 4 is a sectional view of a hermetic seal device according to another embodiment. The description below about components and functions common to those of the hermetic seal device 10 according to the embodiment shown in FIG. 1, etc., will be simplified or omitted, and different points will be mainly described.

A cylindrical member 22 of a hermetic seal device 20 according to this embodiment is provided with threaded portions 22f formed on both ends. FC connectors (connectors in conformity with JIS (Japanese Industrial Standards)) 16 are connected to the threaded portions 22f, respectively. The FC connector 16 is provided with a sleeve 17 fitted on the external surface of the ferrule 4. By inserting a ferrule of another polarization-maintaining optical fiber (not shown) into the sleeve 17, the polarization-maintaining optical fiber 3 and the other polarization-maintaining optical fiber are connected together.

In addition to the FC connector 16, other connectors such as a SC connector (a connector in conformity with JIS) may also be connected to the hermetic seal device 20.

Figure 5:
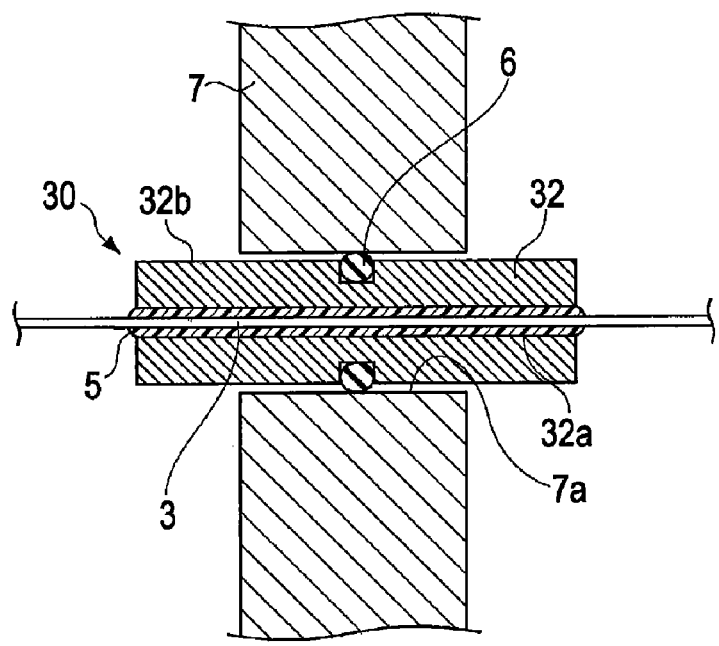
FIG. 5 is a sectional view of a hermetic seal device according to still another embodiment.

FIG. 5 is a sectional view of a hermetic seal device according to still another embodiment. A hermetic seal device 30 according to this embodiment includes a cylindrical member 32 made of ceramics for use in the ferrule, such as zirconia. According to the embodiment, it is also necessary that the difference in expansion-coefficient absolute value between the polarization-maintaining optical fiber 3 and the cylindrical member 32 is established to be $3 \times 10^{-6}$/K or less. The cylindrical member 32 is provided with a through hole 32a in the same way as in the embodiments described above, and the polarization-maintaining optical fiber 3 is inserted into the through hole 32a.

According to the embodiment, the outer diameter of the cylindrical member 32 may be the same as that of a general ferrule or may be larger than that. In order to facilitate the manufacturing of the hermetic seal device 30, the outer diameter of the cylindrical member 32 may be rather larger than that of the general ferrule.

The through hole 32a is filled with the sealing compound 5 made of a resin or the low melting glass. On the external surface of the cylindrical member 32, the O-ring 6 is fitted so as to have airtightness with the contact of the O-ring 6 on the opening 7a of the wall member 7. The cylindrical member 32 is not limited to zirconia and it may be made of other ceramics or alloys and low expansion glass mentioned above.

In such a manner, the cylindrical member 32 is made of a material of the ferrule, so that the configuration of the hermetic seal device 30 can be simplified, reducing the manufacturing cost.

Figure 6:
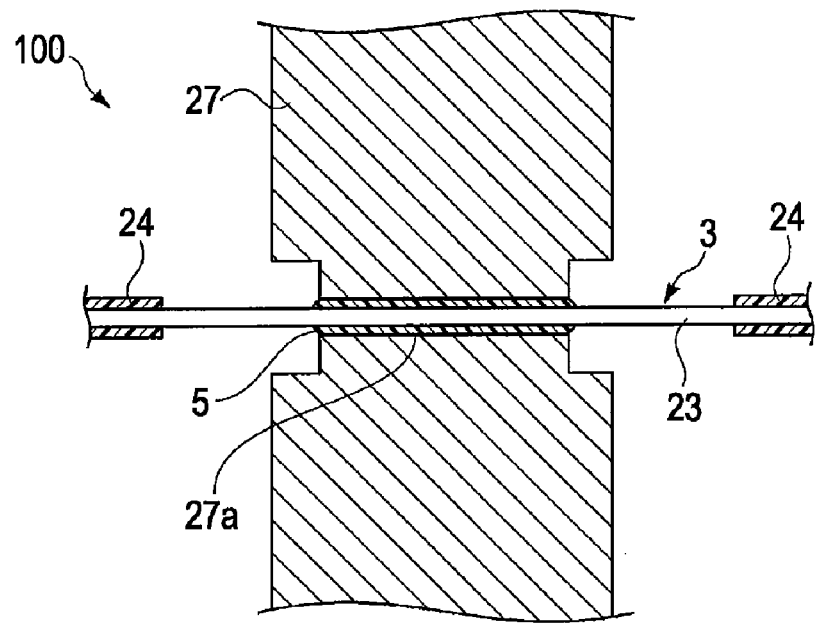
FIG. 6 is a sectional view of a partition according to an embodiment.

FIG. 6 is a sectional view of a partition according to an embodiment of the present invention. A partition 100 according to the embodiment includes a wall member 27 and the polarization-maintaining optical fiber 3 inserted into a through hole 27a formed on the wall member 27. In the same way as described above, the through hole 27a is filled with the sealing compound 5 made of a resin or low melting glass so as to secure the airtightness. According to the embodiment, it is also necessary that the difference in expansion-coefficient absolute value between a core wire 23 of the polarization-maintaining optical fiber and the wall member 27 is established to be $3 \times 10^{-6}$/K or less. The wall member 27 is made of an alloy, a glass material, or ceramics as described in the above embodiments. In such a manner, the polarization-maintaining optical fiber 3 can also be directly fitted to the wall member 27.

Referring to FIG. 6, a type of covering the core wire 23 with a resin covering material 24 is used for the polarization-maintaining optical fiber 3, and at least in a portion of the fiber 3 inserted into the through hole 27a, the core wire 23 is exposed. However, the core wire 23 is not necessarily exposed, and the fiber 3 may be inserted into the through hole 27a in a state covered with the covering material 24 and the sealing compound 5 may be provided around the covering material 24.

Figure 7:
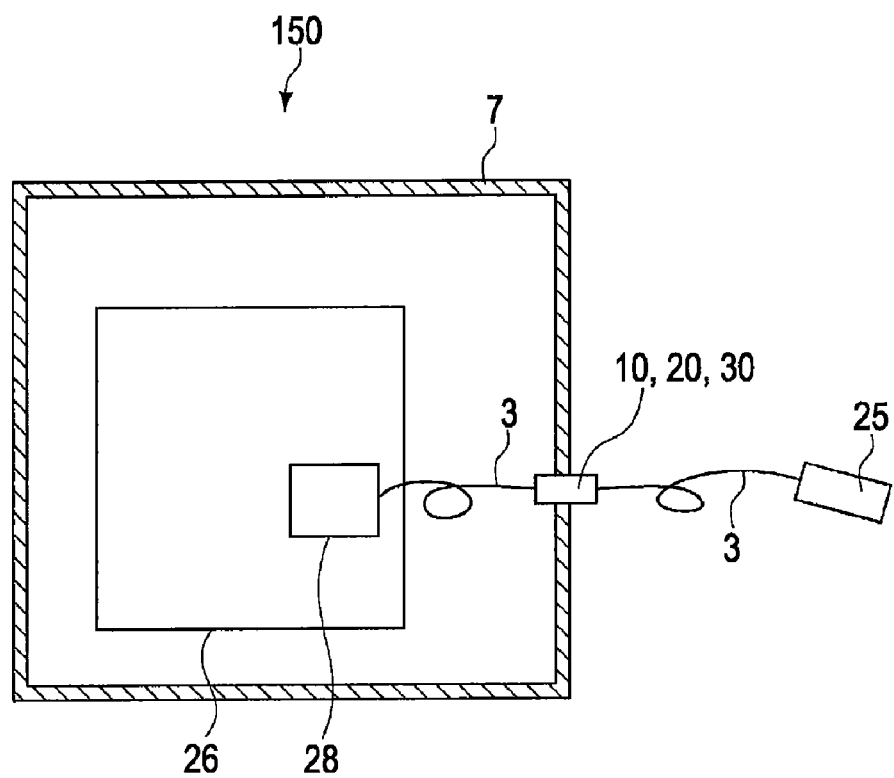
FIG. 7 is a schematic sectional view of a hermetic seal processing apparatus having the hermetic seal device according to the embodiments mounted thereon.

FIG. 7 is a schematic sectional view of a hermetic seal processing apparatus having any one of the hermetic seal devices 10, 20, and 30 mounted thereon. The hermetic seal processing apparatus is for processing anything within a hermetic chamber. Any processing may include heating, gas processing, light irradiation processing, and measuring processing; however, it is not limited to these.

A hermetic seal processing apparatus 150 includes the wall member 7 (may be referred to as a chamber 7 below) constituting a hermetic chamber, the hermetic seal device 10, 20, or 30 for bringing the polarization-maintaining optical fiber 3 extended from a light source 25 attached to the wall member 7 in the chamber 7, and a processing instrument 26 arranged within the chamber 7. When the processing instrument 26 is measuring a length, the polarization-maintaining optical fiber 3 may be connected to an optical sensor 28, or it is used for a linear encoder, a rotary encoder, or a light wave interferometer.

In the hermetic seal processing apparatus 150 shown in FIG. 7, the partition 100 shown in FIG. 6 may be included as the wall member 7 constituting the chamber.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A hermetic seal device for a polarization-maintaining optical fiber, comprising:
    a polarization-maintaining optical fiber; and
    a cylindrical member to be inserted by the polarization-maintaining optical fiber, the cylindrical member having a difference of $3 \times 10^{-6}$/K or less in expansion-coefficient absolute value between the polarization-maintaining optical fiber and the cylindrical member.

2. The device according to claim 1, further comprising a resin sealing material provided around the polarization-maintaining optical fiber within the cylindrical member.

3. The device according to claim 2, wherein the resin sealing material includes an epoxy resin.

4. The device according to claim 1, further comprising a low-melting glass sealing material provided around the polarization-maintaining optical fiber within the cylindrical member.

5. The device according to claim 1, wherein the cylindrical member is made of an alloy, a glass material, or a ceramic.

6. A hermetic seal partition, comprising:
    a polarization-maintaining optical fiber; and
    a wall member to be inserted by the polarization-maintaining optical fiber, the wall member having a difference of $3 \times 10^{-6}$/K or less in expansion-coefficient absolute value between the polarization-maintaining optical fiber and the wall member.

* * * * *